(12) United States Patent
Xie et al.

(10) Patent No.: US 10,312,655 B2
(45) Date of Patent: Jun. 4, 2019

(54) EXCIMER LASER GENERATOR AND EXCIMER LASER ANNEALING EQUIPMENT

(71) Applicants: BOE TECHNOLOGY GROUP CO., LTD., Beijing (CN); CHENGDU BOE OPTOELECTRONICS TECHNOLOGY CO., LTD., Sichuan Province (CN)

(72) Inventors: Yin Xie, Beijing (CN); Zubin Lv, Beijing (CN); Yu Zhang, Beijing (CN); Yongzhou Ling, Beijing (CN); Yayu Wang, Beijing (CN); Jingshuai Wang, Beijing (CN); Chenliang Liu, Beijing (CN); Rujian Li, Beijing (CN); Kang Luo, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/841,619

(22) Filed: Dec. 14, 2017

(65) Prior Publication Data
US 2018/0269643 A1 Sep. 20, 2018

(30) Foreign Application Priority Data
Mar. 17, 2017 (CN) .......................... 2017 1 0160676

(51) Int. Cl.
*H01S 3/034* (2006.01)
*H01S 3/225* (2006.01)
(Continued)

(52) U.S. Cl.
CPC ................ *H01S 3/034* (2013.01); *H01S 3/02* (2013.01); *H01S 3/036* (2013.01); *H01S 3/0346* (2013.01); *H01S 3/225* (2013.01)

(58) Field of Classification Search
CPC ........... H01S 3/225; H01S 3/036; H01S 3/034
See application file for complete search history.

(56) References Cited

U.S. PATENT DOCUMENTS

| 6,768,765 | B1 * | 7/2004 | Schroeder | ............... H01S 3/034 372/103 |
| 2001/0027809 | A1 * | 10/2001 | Guillaume | ............ B01F 3/0473 137/209 |

FOREIGN PATENT DOCUMENTS

| CN | 101431208 A | 5/2009 |
| CN | 104617469 A | 5/2015 |

(Continued)

OTHER PUBLICATIONS

First Office Action from Chinese Patent Application No. 201710160676.0 dated Aug. 15, 2018.

*Primary Examiner* — Michael Carter
(74) *Attorney, Agent, or Firm* — Calfee, Halter & Griswold LLP

(57) ABSTRACT

An excimer laser generator and an excimer laser annealing equipment are disclosed to improve the convenience of window replacement, improve the replacement efficiency and reduce the gas waste. The excimer laser generator includes a reflector, an active medium cavity and an output mirror arranged in sequence. The active medium cavity has a first opening facing the reflector and a second opening facing the output mirror. The excimer laser generator further includes two replacement units respectively arranged between the first opening and the reflector, and between the second opening and the output mirror. Each of the replacement units includes a support plate and a driving component.

(Continued)

The support plate is provided with a plurality of windows, and the driving component is adapted for driving the support plate so that one of the plurality of windows seals a corresponding opening.

16 Claims, 2 Drawing Sheets

(51) Int. Cl.
*H01S 3/036* (2006.01)
*H01S 3/02* (2006.01)

(56) References Cited

FOREIGN PATENT DOCUMENTS

| CN | 204992232 U |   | 1/2016 |
|----|-------------|---|--------|
| JP | 61203689    | * | 9/1986 |
| JP | 61203689 A  |   | 9/1986 |

* cited by examiner

EXCIMER LASER GENERATOR AND EXCIMER LASER ANNEALING EQUIPMENT

RELATED APPLICATIONS

The present application claims the benefit of Chinese Patent Application No. 201710160676.0, filed on Mar. 17, 2017, the entire disclosures of which are incorporated herein by reference.

TECHNICAL FIELD

The present disclosure relates to the field of display manufacturing technology, and particularly to an excimer laser generator and an excimer laser annealing equipment.

BACKGROUND

The laser system used in excimer laser annealing equipment is a gas laser system. In the process of generating laser, a lot of impurities or chemical products will be deposited on the surface of the window. These impurities worsen the spot quality and energy of the laser beam emitted by the excimer laser annealing equipment, causing pulse pollution or poor performance.

At present, the window of the excimer laser generator is a disposable design, and the window can only be replaced at the end of the working life of the laser gas in the laser resonator (e.g., 100 million pulses). This often leads to the following problem: after the gas has been used for a certain period (e.g., 50 million pulses), the surface of the window may be already dirty and the quality and energy of the laser spot are deteriorated. Then the window needs to be replaced. However, in the existing design, the laser gas should be exhausted from the laser resonator before replacing the window, involving heating and cooling processes of the gas laser resonator, the low temperature condenser and the like. This takes a lot of time (about 4 hours) and the laser gas is very expensive. Considering the issues such as the cost and utilization rate, the window is only replaced at the end of the working life of the laser gas (e.g., 100 million pulses), the laser spot and energy at that time have become very poor.

SUMMARY

The embodiments of the present disclosure provide an excimer laser generator and an excimer laser annealing equipment. The excimer laser generator comprises: a reflector, an active medium cavity and an output mirror arranged in sequence; the active medium cavity having a first opening facing the reflector and a second opening facing the output mirror. The excimer laser generator further comprises two replacement units respectively arranged between the first opening and the reflector, and between the second opening and the output mirror. Each of the replacement units comprises a support plate and a driving component. The support plate is provided with a plurality of windows, and the driving component is adapted for driving the support plate so that one of the plurality of windows seals a corresponding opening.

The excimer laser generator provided by the present disclosure can facilitate the window replacement by providing a replacement unit. During the replacement, the window replacement can be completed by only operating the driving component. By applying a pressure balancing unit, the pressures inside and outside the active medium cavity can be adjusted, which can also facilitate window replacement. The excimer laser generator provided by the present disclosure does not need to exhaust and re-inject the laser gas during the window replacement and does not require the heating and cooling processes of the gas laser resonator, the low temperature condenser and the like, only the pressures inside and outside the active medium cavity need to be adjusted.

Therefore, the excimer laser generator provided by the present disclosure can improve the convenience of the window replacement, improve the replacement efficiency and reduce gas waste.

In some exemplary embodiments, the excimer laser generator further comprises a seal ring located between the window and the corresponding opening. The seal ring can be arranged to prevent gas leakage in the active medium cavity.

In some exemplary embodiments, the excimer laser generator further comprises two pressure balancing units located at the first opening and the second opening respectively. Each pressure balancing unit comprises: a pressure regulating cavity surrounding each replacement unit, the pressure regulating cavity being provided with a gas inlet and a gas outlet; a gas supply member for supplying gas to the pressure regulating cavity; a regulating valve provided on a communication line between the gas supply member and the gas inlet; and an on-off valve provided on the gas outlet.

By adjusting the regulating valve and the on-off valve, the pressures inside and outside the active medium cavity can be adjusted. When the window needs to be replaced, the pressures inside and outside the active medium cavity can be adjusted to the same value, so that the window can be replaced. After the window replacement, the pressure outside the active medium cavity can be reduced, and the new window can seal the active medium cavity well.

In some exemplary embodiments, the gas supply member is a gasbag or a gas cushion. The structure of gas bag or gas cushion is simple, thus reducing the complexity of the system.

In some exemplary embodiments, each pressure balancing unit further comprises: a sensor for detecting a pressure in the active medium cavity; and a controller in signal connection with the sensor, the on-off valve and the regulating valve. The controller can adjust the regulating valve and the on-off valve based on the pressure detected by the sensor so that pressures inside and outside the active medium cavity are equal. The pressures inside and outside the active medium cavity can thus be adjusted automatically, facilitating the operation.

The pressure in the active medium cavity can be detected at preset time intervals.

In some exemplary embodiments, when the pressures inside and outside the active medium cavity are equal, the controller controls the driving component so that one of the plurality of windows seals the corresponding opening, and the controller opens the on-off valve. In this way, the window replacement can be completed automatically.

In some exemplary embodiments, the driving component comprises a driving motor and a transmission rod. One end of the transmission rod is connected with the support plate, and the other end of the transmission rod is connected with an output shaft of the driving motor.

In exemplary embodiments, the support plate is circular, and the plurality of windows are arranged within a circumference of the support plate.

In some exemplary embodiments, the support plate is rectangular, and the plurality of windows is arranged on the support plate in an array.

In some exemplary embodiments, the plurality of windows is formed integrally. That is, the plurality of windows can be obtained by dividing an integral transparent element, and specific regions of the plurality of windows can be arranged according to the size of the opening. With such an arrangement, the replacement units can be simplified.

The present disclosure also provides an excimer laser annealing equipment comprising the excimer laser generator according to any one of the above embodiments. The implementation of the excimer laser annealing equipment can refer to the embodiments of the excimer laser generator, which is not repeated herein.

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

In the prior art, an excimer laser generator in an excimer laser annealing equipment mainly comprises a reflector, an active medium cavity with a gas inlet and a gas outlet, and an output mirror. The reflector, the active medium cavity and the output mirror form a gas laser resonator. The end of the active medium cavity close to the reflector and the end of the active medium cavity close to the output mirror are respectively provided with a window. The window is sealed and connected with the gas laser resonator, and the active medium cavity realizes population inversion, thereby resulting in optical amplification. The function of the gas laser resonator is to select light of the same frequency and the same direction for the prior amplification, and to suppress the light of other frequencies and directions. The photons that do not move along the axis of the gas laser resonator quickly escape the resonator and no longer come into contact with the active medium. The photons moving along the axis propagate in the active medium cavity and pass through the windows. Due to the reflection of the reflector and the output mirror, the photons continue to run back and forth, generating oscillation. During propagation, the photons continue to meet stimulated particles and produce stimulated radiation. The photons propagating along the axis will proliferate. Thus, in the active medium cavity, a strong light beam (i.e., laser) with a uniform direction of propagation, the same frequency and phase can be generated. In the process of generating laser, a lot of impurities or chemical products will be deposited on the surface of the window.

These impurities worsen the spot quality and energy of the laser beam emitted by the excimer laser annealing equipment, causing pulse pollution or poor performance. At present, the window of the excimer laser generator is a disposable design, and the window can only be replaced at the end of the working life of the laser gas in the laser resonator (e.g., 100 million pulses). This often leads to the following problem: after the gas has been used for a certain period (e.g., 50 million pulses), the surface of the window may be already dirty and the quality and energy of the laser spot are deteriorated.

Figure 1:
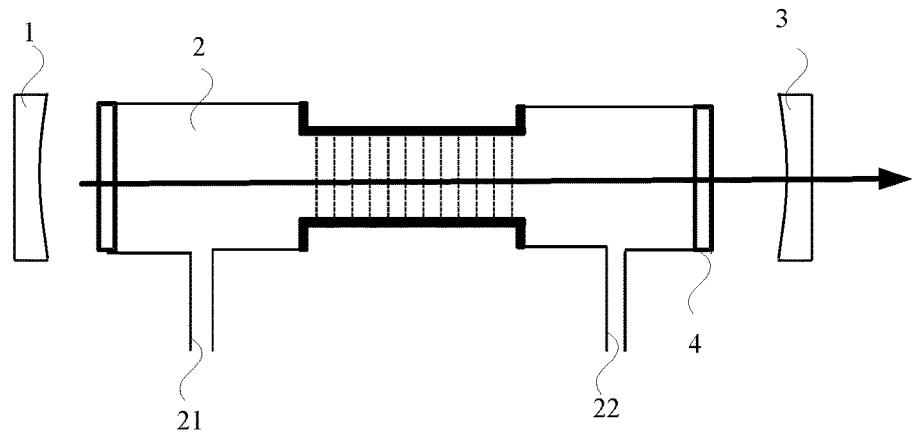
FIG. 1 is a structural schematic diagram of an excimer laser generator according to an embodiment of the present disclosure.
Figure 2:
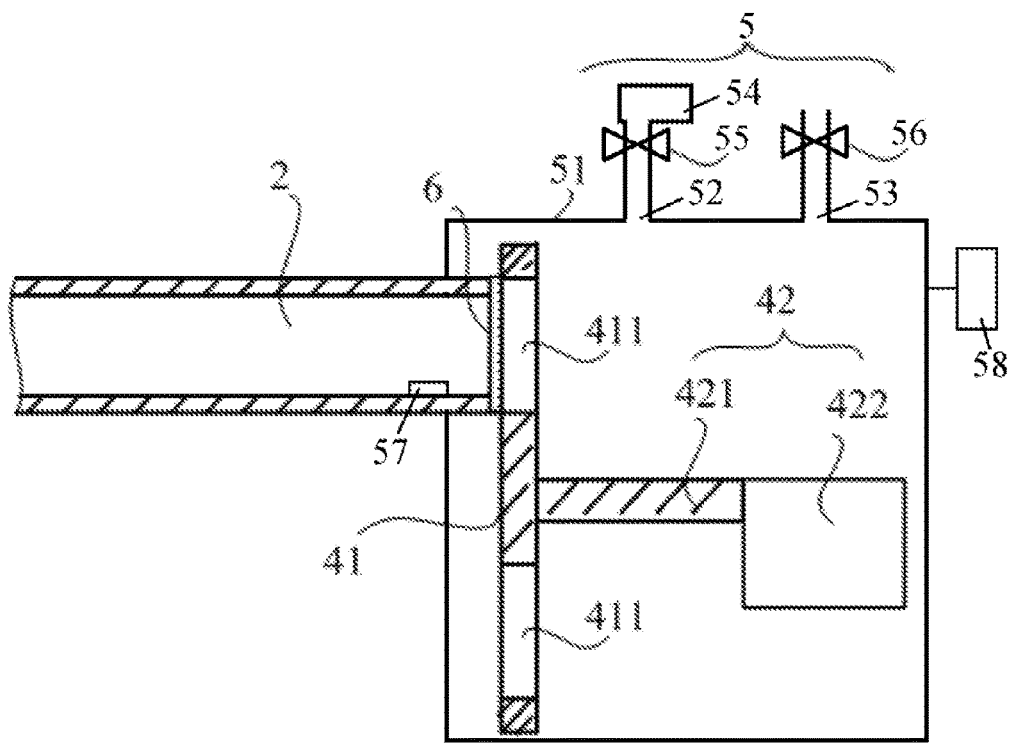
FIG. 2 is a local section of an excimer laser generator according to an embodiment of the present disclosure.
Figure 3:
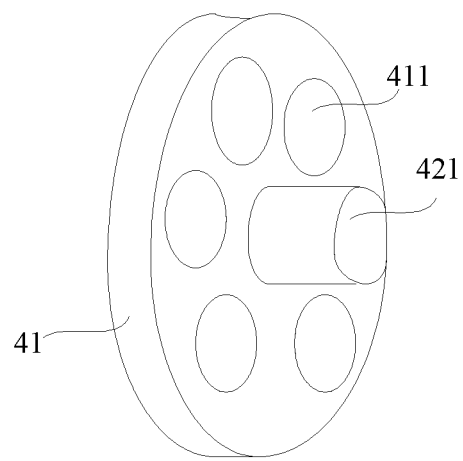
FIG. 3 is a structural schematic diagram of a replacement unit in an excimer laser generator according to an embodiment of the present disclosure.

In order to solve the above problem, as shown in FIG. 1, FIG. 2 and FIG. 3, the present disclosure provides an excimer laser generator. The excimer laser generator comprises: a reflector 1, an active medium cavity 2 and an output mirror 3 arranged in sequence. The active medium cavity 2 has a first opening facing the reflector 1 and a second opening facing the output mirror 3. The excimer laser generator further comprises two replacement units 4 respectively arranged between the first opening and the reflector 1, and between the second opening and the output mirror 3. Each of the replacement units 4 comprises a support plate 41 and a driving component 42. The support plate 41 is provided with a plurality of windows 411, and the driving component 42 is adapted for driving the support plate 41 so that one of the plurality of windows 411 seals a corresponding opening.

The excimer laser generator can further comprise two pressure balancing units 5 located at the first opening and the second opening respectively. The pressure balancing units 5 can be applied to adjust the pressures inside and outside the active medium cavity 2.

The excimer laser generator provided by the present disclosure can facilitate the replacement of the window 411 by providing a replacement unit 4. During the replacement, the replacement of the window 411 can be completed by only operating the driving component 42. By applying a pressure balancing unit 5, the pressures inside and outside the active medium cavity 2 can be adjusted, which can also facilitate the replacement of the window 411. The excimer laser generator provided by the present disclosure does not need to exhaust and re-inject the laser gas during the replacement of the window 411 and does not require the heating and cooling processes of the gas laser resonator, the low temperature condenser and the like, only the pressures inside and outside the active medium cavity 2 need to be adjusted.

Therefore, the excimer laser generator provided by the present disclosure can improve the convenience of the replacement of the window 411, improve the replacement efficiency and reduce gas waste.

The active medium cavity 2 of the excimer laser generator provided by the present disclosure can further be provided with an inlet 21 and an outlet 22 for circulation of the working gas.

The shape of the window can be square, triangle, or circle, etc. The specific shape can be determined according to the shapes of the first opening and the second opening of the active medium cavity.

As shown in FIG. 2, in some embodiments of the present disclosure, the excimer laser generator further comprises a seal ring 6 located between the window 411 and the corresponding opening. The seal ring 6 can be arranged to prevent gas leakage in the active medium cavity 2. The shape of the seal ring 6 can be square or circular, which will not be introduced in detail herein.

The specific structure of each pressure balancing unit 5 described above can be various, as long as the pressure outside the active medium cavity can be adjusted.

In some exemplary embodiments, the excimer laser generator provided by the embodiment of the disclosure further comprises two pressure balancing units 5 located at the first opening and the second opening respectively, as shown in FIG. 2. Each pressure balancing unit 5 comprises: a pressure regulating cavity 51 surrounding each replacement unit 4. The pressure regulating cavity 51 is provided with a gas inlet 52 and a gas outlet 53. The pressure balancing unit 5 also comprises: a gas supply member 54 for supplying gas to the pressure regulating cavity 51; a regulating valve 55 provided on a communication line between the gas supply member 54 and the gas inlet 52; and an on-off valve 56 provided on the gas outlet 53.

By adjusting the regulating valve 55 and the on-off valve 56, the pressures inside and outside the active medium cavity can be adjusted. When the window 411 needs to be replaced, the pressures inside and outside the active medium cavity can be adjusted to the same value, and then the window 411 can be replaced. After the window is replaced, the pressure outside the active medium cavity can be reduced, and the new window can seal the active medium cavity well. The gas introduced into the air inlet can be nitrogen or air.

In order to further facilitate the replacement of the window 411, an automatic locking device can be disposed between the window 411 and the active medium cavity 2. Before the window 411 is replaced and the pressure regulating cavity is depressurized, the window 411 can be fixed on the active medium cavity 2. In this way, the generation of laser in the active medium cavity will not be affected, further improving the production efficiency.

In some exemplary embodiments, the gas supply member is a gasbag or a gas cushion. The structure of gas bag or gas cushion is simple, thus reducing the complexity of the system.

In some exemplary embodiments, each pressure balancing unit 5 further comprises: a sensor 57 for detecting a pressure in the active medium cavity; and a controller 58 in signal connection with the sensor 57, the on-off valve 56 and the regulating valve 55. The controller 58 can adjust the regulating valve 55 and the on-off valve 56 based on the pressure detected by the sensor 57 so that pressures inside and outside the active medium cavity 2 are equal. With such an arrangement, the pressures inside and outside the active medium cavity can be adjusted automatically without manual regulation, facilitating the operation.

The pressure in the active medium cavity can be detected at preset time intervals.

The turning-on and turning-off of the driving component 42 can be manually controlled through an external button, and can also be controlled automatically. The controller can be connected with the driving component 42. Optionally, when the pressures inside and outside the active medium cavity 2 are equal, the controller 58 controls the driving component 42 so that one of the plurality of windows seals the corresponding opening, and the controller 58 opens the on-off valve. In this way, the window replacement can be completed automatically.

The specific structure of the driving component 42 can be various. The support plate 41 can be rotated to replace the window 411 or can be translated to replace the window 411. In an implementation provided by the present disclosure, as shown in FIG. 2, the driving component 42 comprises a driving motor 422 and a transmission rod 421. One end of the transmission rod 421 is connected with the support plate 41, and the other end of the transmission rod 421 is connected with an output shaft of the driving motor 422. The driving motor 422 drives the transmission rod 421 to rotate, so as to rotate the support plate 41.

The specific shape of the support plate 41 can be various. As shown in FIG. 3, the support plate 41 is circular, and the plurality of windows 411 are arranged within a circumference of the support plate 41.

Figure 4:
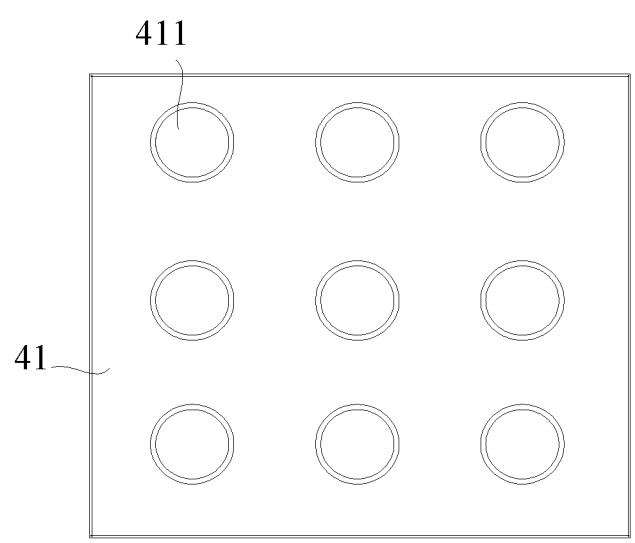
FIG. 4 is a schematic diagram of an arrangement structure of windows on a support plate according to an embodiment of the present disclosure.

As shown in FIG. 4, the support plate 41 is rectangular, and the plurality of windows 411 is arranged on the support plate 41 in an array.

In some exemplary embodiments, the plurality of windows is formed integrally. That is, the plurality of windows can be obtained by dividing an integral transparent element, and specific regions of the plurality of windows can be arranged according to the size of the opening. With such an arrangement, the replacement units can be simplified.

The present disclosure also provides an excimer laser annealing equipment comprising the excimer laser generator according to any one of the above embodiments. The implementation of the excimer laser annealing equipment can refer to the embodiments of the excimer laser generator, which is not repeated herein.

Apparently, the person skilled in the art may make various alterations and variations to the disclosure without departing the spirit and scope of the disclosure. As such, provided that these modifications and variations of the disclosure pertain to the scope of the claims of the disclosure and their equivalents, the disclosure is intended to embrace these alterations and variations.

What is claimed is:

1. An excimer laser generator, comprising: a reflector, an active medium cavity and an output mirror arranged in sequence; the active medium cavity having a first opening facing the reflector and a second opening facing the output mirror;

wherein the excimer laser generator further comprises two replacement units respectively arranged between the first opening and the reflector, and between the second opening and the output mirror; each of the replacement units comprises a support plate and a driving component; the support plate is provided with a plurality of windows, and the driving component is adapted for driving the support plate so that one of the plurality of windows seals a corresponding opening;

wherein the excimer laser generator further comprises two pressure balancing units located at the first opening and the second opening respectively;

wherein each pressure balancing unit comprises: a pressure regulating cavity surrounding each replacement unit, the pressure regulating cavity being provided with a gas inlet and a gas outlet; a gas supply member for supplying gas to the pressure regulating cavity; a regulating valve provided on a communication line between the gas supply member and the gas inlet; and an on-off valve provided on the gas outlet; and wherein the gas supply member is a gasbag or a gas cushion.

2. The excimer laser generator according to claim 1, further comprising: a seal ring located between one of the openings and one of the plurality of windows sealing the opening.

3. The excimer laser generator according to claim 1, wherein each pressure balancing unit further comprises:
   a sensor for detecting a pressure in the active medium cavity;

a controller in signal connection with the sensor, the on-off valve and the regulating valve; the controller adjusting the regulating valve and the on-off valve based on the pressure detected by the sensor so that pressures inside and outside the active medium cavity are equal.

4. The excimer laser generator according to claim 3, wherein when the pressures inside and outside the active medium cavity are equal, the controller controls the driving component so that one of the plurality of windows seals the corresponding opening, and the controller opens the on-off valve.

5. The excimer laser generator according to claim 4, wherein the driving component comprises:
a driving motor;
a transmission rod, one end of the transmission rod is connected with the support plate, and the other end of the transmission rod is connected with an output shaft of the driving motor.

6. The excimer laser generator according to claim 1, wherein the support plate is circular, and the plurality of windows are arranged within a circumference of the support plate.

7. The excimer laser generator according to claim 1, wherein the support plate is rectangular, and the plurality of windows are arranged on the support plate in an array.

8. The excimer laser generator according to claim 1, wherein the plurality of windows are formed integrally.

9. An excimer laser annealing equipment comprising an excimer laser generator;
wherein the excimer laser generator comprises: a reflector, an active medium cavity and an output mirror arranged in sequence; the active medium cavity having a first opening facing the reflector and a second opening facing the output mirror;
wherein the excimer laser generator further comprises two replacement units respectively arranged between the first opening and the reflector, and between the second opening and the output mirror; each of the replacement units comprises a support plate and a driving component; the support plate is provided with a plurality of windows, and the driving component is adapted for driving the support plate so that one of the plurality of windows seals a corresponding opening;
wherein the excimer laser generator further comprises two pressure balancing units located at the first opening and the second opening respectively;
wherein each pressure balancing unit comprises: a pressure regulating cavity surrounding each replacement unit, the pressure regulating cavity being provided with a gas inlet and a gas outlet; a gas supply member for supplying gas to the pressure regulating cavity; a regulating valve provided on a communication line between the gas supply member and the gas inlet; and an on-off valve provided on the gas outlet; and
wherein the gas supply member is a gasbag or a gas cushion.

10. The excimer laser annealing equipment according to claim 9, further comprising: a seal ring located between one of the openings and one of the plurality of windows sealing the opening.

11. The excimer laser annealing equipment according to claim 9, wherein each pressure balancing unit further comprises:
a sensor for detecting a pressure in the active medium cavity;
a controller in signal connection with the sensor, the on-off valve and the regulating valve; the controller adjusting the regulating valve and the on-off valve based on the pressure detected by the sensor so that pressures inside and outside the active medium cavity are equal.

12. The excimer laser annealing equipment according to claim 11, wherein when the pressures inside and outside the active medium cavity are equal, the controller controls the driving component so that one of the plurality of windows seals the corresponding opening, and the controller opens the on-off valve.

13. The excimer laser annealing equipment according to claim 12, wherein the driving component comprises:
a driving motor;
a transmission rod, one end of the transmission rod is connected with the support plate, and the other end of the transmission rod is connected with an output shaft of the driving motor.

14. The excimer laser annealing equipment according to claim 9, wherein the support plate is circular, and the plurality of windows are arranged within a circumference of the support plate.

15. The excimer laser annealing equipment according to claim 9, wherein the support plate is rectangular, and the plurality of windows are arranged on the support plate in an array.

16. The excimer laser annealing equipment according to claim 9, wherein the plurality of windows are formed integrally.

* * * * *